Figure 1:
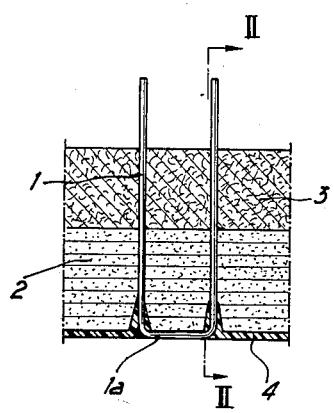

Oct. 16, 1962     L. C. LAROCHE     3,058,168

CARDING CLOTHING

Filed Jan. 2, 1959

INVENTOR:-
LEON CLAUDE LAROCHE

By:- J. Chatwin
ATTY.

3,058,168
CARDING CLOTHING
Léon Claude Laroche, Le Vesinet, France. (35 Rue du Marechal Joffre, St. Germain-en-Laye (Seine et Oise), France)
Filed Jan. 2, 1959, Ser. No. 784,648
Claims priority, application France Jan. 8, 1958
1 Claim. (Cl. 19—114)

The present invention relates to carding clothing, usable not only in carding or other textile machines, such as teaseling machines, combing machines, etc., but also in other industries such as those of tobacco, rubber, asbestos, glass fibre, etc.

Usually carding cloth is constituted by steel teeth of hair-pin form engaged through a flexible support. This flexible support can be constituted by a thickness of natural or synthetic leather, or other material, but most often it is formed of a number of fabric layers assembled with adhesive and which may be associated with other layers of composition or various materials, wool felt or plastic materials.

Such carding clothing is more or less rapidly put out of use for two main reasons, firstly the wear on the teeth consequent to the frequent sharpenings necessary so that the teeth may retain their keenness, and also the increase of size of the passages of the teeth in the support or foundation, by reason of the pressures exerted by the worked material upon the points of the teeth.

Furthermore the teeth are set in their support after having received their final shape. In order to pass the tooth with its formed hook into the hole formed, it is necessary that the hole forced in the support should be several times larger than the diameter of the wire. This hole then always incompletely recloses about the legs of the tooth, which gives a start to the increase of size of the said holes.

The object of the invention is to provide an improvement in carding clothing, for the purpose of obviating the above-stated disadvantages.

For this purpose, the lower face of the support, beneath which the butts of the teeth are situated, is covered with a layer of plastic material in the form of semi-liquid paste, which envelops and imprisons the said butts, and introduces itself into the interstices existing between the support and the legs of the teeth. Then this layer of plastic is polymerized or hardened by baking or other process, in order to weld it to the support and to the butts, fixing the teeth positively in the composite mass thus obtained.

In accordance with another characteristic feature the butt of each tooth is in the form of a single curvature of large radius, connecting the two legs of the tooth, without sudden variation. This permits using much harder steels than those of conventional teeth, which have two sharp right-angle bends, which are however obligatory, which limit the resistance and the hardness of the steel used. This more resistant and harder steel is generally the result of an increase in its carbon content.

Furthermore due to the fixing reinforced by the layer of plastic material in which the tooth butts are embedded it is possible to manufacture the teeth of flat steel, which considerably improves the quality of the carding, without thereby risking this attenuation, which is favourable for the quality of the carding, facilitating the increase of size of the holes in the support.

The invention will be better understood on reading of the following description and on examination of the accompanying drawings, which show some forms of embodiment by way of non-limitative examples.

Figure 2:
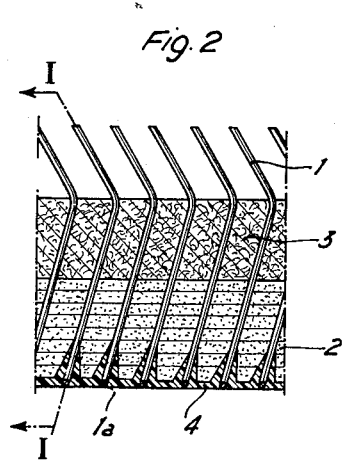
Figure 3:
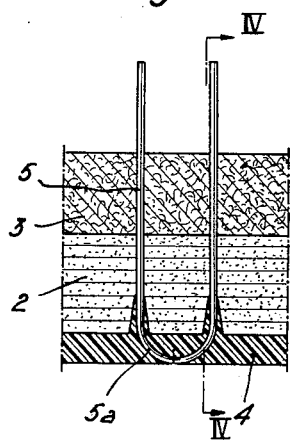
Figure 4:
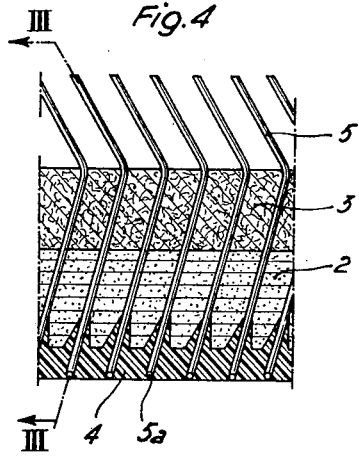

In the drawings:

FIGURES 1 and 2 are front and profile sections of carding clothing with conventional tooth 1 of ordinary steel, but possessing in part a layer 4 of plastic enveloping the butts 1a. FIG. 1 is a section on the line I—I of FIG. 2, and FIG. 2 is a section on the line II—II of FIG. 1. FIGURES 3 and 4 are front and profile sections of carding clothing, with teeth of hard steel, rounded butt, with plastic layer surrounding the butts. FIG. 3 is a section on the line III—III of FIG. 4, and FIG. 4 is a section on the line IV—IV of FIG. 3.

The carding clothing as represented in FIGURES 1 and 2 is constituted by conventional U-shaped pins 1 with sharp bends which do not permit of using hard steel, but possessing the plastic layer 4 which imprisons the butts and therefore possesses the advantages of fixing of the latter in the supports 2 and 3.

FIGURES 3 and 4 represent carding clothing according to the invention, possessing teeth 5 with large radius of curvature permitting of using harder steel, the butts 5a of which are entirely enveloped by a layer of plastic 4 deposited in the form of paste, which imprisons the butts and is introduced into the interstices existing between the support and the legs of the teeth. Each wire tooth consists of a length of hard steel wire formed into a substantially U-shape containing two legs which merge into and are coupled by a butt end shaped as a continuous curve lying in the same plane as the portion of each leg adjacent to the butt end. Each tooth further consists of each leg having a free end portion remote from the butt end bent with respect to the remainder of the leg containing the butt end so that the free end portions of the legs are parallel and lie in a plane inclined with respect to the plane containing the remainder of the legs. The free end portions extend beyond the strip of support material. This layer of plastic material is then polymerised or hardened by baking or other process, according to its nature, so that it welds itself intimately to the face of the support and positively fixes the teeth in the composite mass thus obtained.

By virtue of this construction the teeth are very firmly fixed in the support, and it becomes possible to make them of flat steel, without danger of enlargement of the holes of the support in which they are fitted. The teeth are then thinner than the conventional teeth in the direction perpendicular to the direction of carding, and on the other hand are stouter in the direction of carding and of the force to which they are subjected, which provides the three sought conditions:

(a) Greater production, due to the fact of having stronger steel of more appropriate form in the direction where the strength is required.

(b) Quality of carding maintained despite the increase of production, due to the decrease of thickness of the teeth at the carding point.

(c) Less frequent sharpening due to the fact of the harder steel.

Furthermore such carding clothing, instead of subsequently bearing by the butt end of the teeth on the metallic cylinder carrying it, and the adherence of which upon the cylinder is very slight, on the contrary bears with the entire surface of the plastic, which is of very great adherence.

Furthermore the plastic layer imprisons the butts and a part of the legs in air-tight fashion, so that these are sheltered from the air and protected against oxidisation which frequently occurs and causes premature destruction.

Furthermore if in the plastic material used there are incorporated electrically conductive additives, carbon black, metallic oxides, or other bodies, a diffusion and perfect evacuation of the static electricity produced by friction of the carding machine on certain materials is effected, the presence of such static electricity being excessively irksome.

Finally in view of the great strength qualities of certain plastics used applied to the lower face of the support, it becomes possible, for equal strength of the fitting assembly, to reduce the thickness of the support.

The reduction of the frequency of sharpenings while increasing the life of the fitting at the same time reduces the loss of production resulting from the time spent in sharpening.

As plastic material it is possible to use for example a vinyl chloride which will be polymerised, or a vinyl acetate which will be baked.

Naturally such fittings can also comprise certain improvements in use proper to all fittings, such as a plastic layer on the felt if felt exists, or on the cotton base, facilitating the cleaning and isolating the fitting from the greasing products.

I claim:

Card clothing consisting of a strip of support material having wire teeth set transversely therethrough at substantially right angles to the plane of said support material, each wire tooth consisting of a length of hard steel wire formed into a substantially U-shape containing two legs which merge into and are coupled by a butt end shaped as a continuous curve lying in the same plane as the portion of each leg adjacent to said butt end, each leg having a free end portion remote from said butt end bent with respect to the remainder of the leg containing the butt end so that the free end portions of the legs are parallel and lie in a plane inclined with respect to the plane containing the remainder of the legs and extend beyond one surface of said strip of support material, said butt end of each tooth protruding slightly from the other surface of said strip of support material, and a layer of hardenable plastic material applied on the other surface of said strip of support material to completely enclose the butt ends of said teeth into an integral and continuous support material for said teeth and to pass into the interstices of said support material to lend additional support thereto.

References Cited in the file of this patent

UNITED STATES PATENTS

| 217,100 | Harding | July 1, 1879 |
| 241,997 | Kershaw et al. | May 24, 1881 |
| 662,587 | Blake | Nov. 27, 1900 |
| 1,321,623 | Griswold | Nov. 11, 1919 |
| 2,161,632 | Natterheimer | June 6, 1939 |
| 2,619,683 | Murray | Dec. 2, 1952 |

FOREIGN PATENTS

| 1,120,014 | France | Apr. 9, 1956 |
| 1,123 | Great Britain | of 1879 |
| 2,252 | Great Britain | of 1882 |
| 3,696 | Great Britain | of 1891 |
| 390,203 | Great Britain | Apr. 3, 1933 |
| 467,141 | Great Britain | June 11, 1937 |